Dec. 1, 1953  L. ISACHSEN  2,661,235
VEHICLE FOR TIMBER TRANSPORT
Filed June 22, 1951
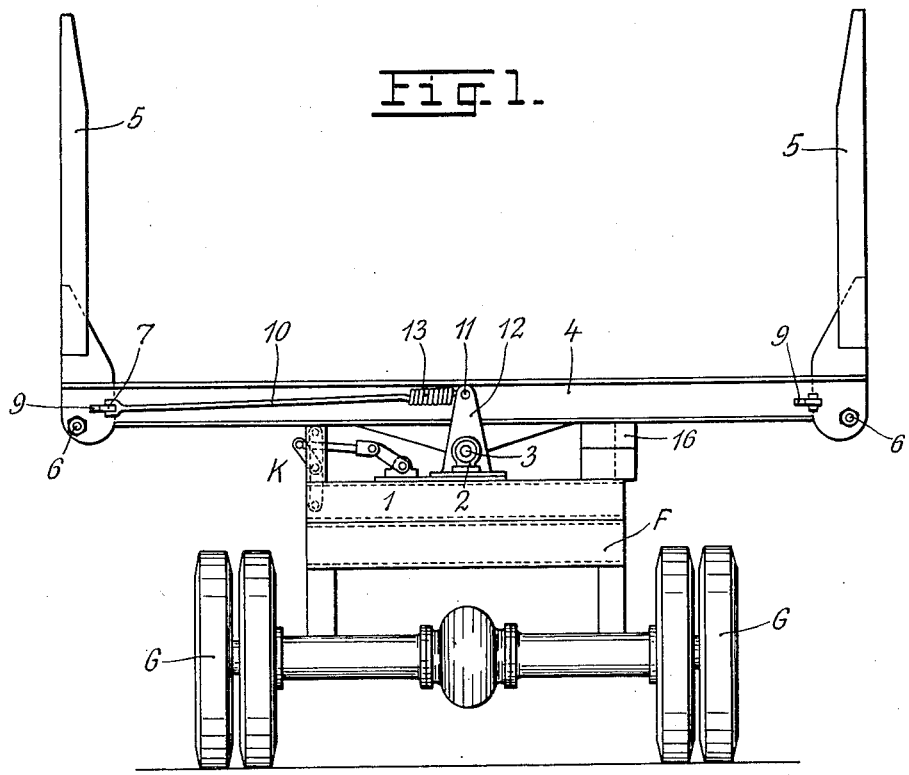
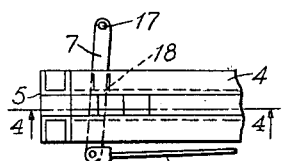
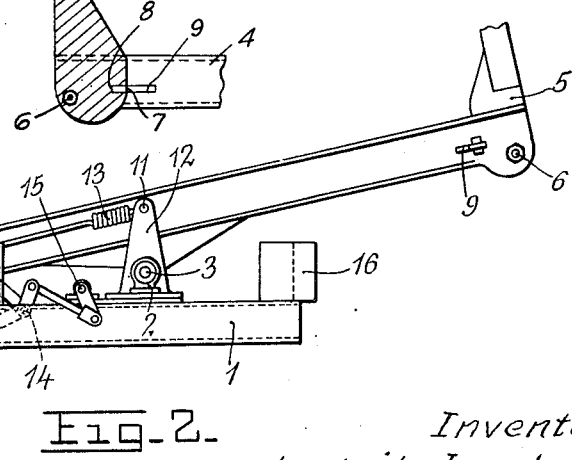
Inventor
Ludvik Isachsen
By
Atty.

Patented Dec. 1, 1953

2,661,235

UNITED STATES PATENT OFFICE 2,661,235

VEHICLE FOR TIMBER TRANSPORT

Ludvik Isachsen, Larvik, Norway

Application June 22, 1951, Serial No. 233,083

Claims priority, application Norway July 5, 1950

2 Claims. (Cl. 298—18)

The present invention relates to improvements in vehicles, and more particularly to trucks, trailers and the like for timber transport, wherein the timber logs rest upon two cross beams having at each end pivotable side posts which may be swung downwardly when unloading the vehicle.

The main object of the invention is to provide a vehicle of the type referred to in which the cross beams serving as bed for the timber logs are so arranged that said beams with the load placed thereon, may be tilted to the desired side of the vehicle in order to facilitate the unloading, especially in case of bundled logs which have difficulty in rolling off.

A further object of the invention is to provide means by which the side posts, which normally are locked in upright position, during tilting of the cross beams, are automatically released at that side of the vehicle toward which said beams are tilted and allowed to swing downwardly.

These and other features of the invention will be apparent in the course of the following detailed description in which reference is made to the accompanying drawings, wherein:

Figure 1 is a rear elevation of parts of a vehicle embodying the invention in normal transport position;

Fig. 2 is a partial rear elevation of the vehicle showing the mechanism in unloading position;

Fig. 3 is a detail view of the latching and releasing mechanism for the side posts; and Fig. 4 is a section taken on the line 4—4 of Fig. 3.

In the drawing 1 denotes a fixed beam or the like mounted on the frame F of a vehicle and provided with a bracket 2 constituting a bearing for a pivot 3 which supports a cross beam 4. Said cross beam projects at both sides of the vertical axial plane through the pivot 3, and at both ends is provided with side posts 5, which are pivotally secured by means of pivots 6. Said posts are held in upright or load carrying position by means of latching members 7 engaging into side notches 8 at the lower end of said posts as shown in Figs. 1 and 3. The latching member 7 is pivoted at 17 to a bracket 18 (Fig. 3) for movement in a longitudinal slot 9 in the beam 4 and may be moved back and forth in the slot by means of a rod 10 which connects said member 7 with a fixed point constituted by a pivot 11 on a bracket 12 which also is secured on the upper side of the member 1. The pivot 11 is placed in the same vertical plane as, but at a higher level than the pivot 3. A spring 13 is connected between the pivot 11 and the rod 10 to allow the latching member 7 to snap into the notch 8 when the cross beam 4 and the post 5 are restored to load carrying position.

In operative position the cross beam 4 is supported at one or both sides of its pivot 3 by a releasable mechanism, preferably in the form of a toggle device which in the drawing is denoted generally K and which may be common for both of the beams if two such beams are used, which generally is sufficient in transporting timber.

Pivot 14 connecting the links of the toggle device is connected by means of a link mechanism to a rod 15 mounted rotatably in the longitudinal direction of the vehicle.

In the drawing a releasing mechanism is shown only in connection with the post 5 at one end of the cross beam, but as will be understood, a similar mechanism may also be provided for the post 5 at the opposite end of said cross beam. In that case the supporting block 16, shown at the right hand side in the Figures 1 and 2 is replaced by a releasable toggle device similar to that shown at K at the left hand side.

When the vehicle is loaded with timber it rests upon the cross beams 4 and is held in the side directions by means of the posts 5. When the vehicle is to be unloaded it is usually driven to a place at which the wheels G at one of its sides occupy a higher position than the wheels G at the opposite side.

When the vehicle has attained said position, the rod 15 is turned in a clockwise direction, whereby the toggle mechanism is shifted from the position shown in Fig. 1 to that shown in Fig. 2, and then the timber by means of its own weight and the oblique position of the vehicle, will effect tilting of the cross beams 4 to the position shown in Fig. 2.

During this tilting a relative movement between the latching member 7 and the cross beam 4 takes place at that end of said beam which is moving downwardly, so that the latching member is released from the notch 8, and consequently the timber by its weight will swing the post 5 about its pivot 6 and slide out from the vehicle.

If a releasing mechanism is arranged also at the opposite end of the cross beam, the spring 13, inserted in the connection between the locking member and the fixed point 11 thereof, will only be compressed without releasing the latching member at that side. When the timber logs are unloaded the rod 15 is turned back, whereby the beams 4 return to their normal horizontal position, and thereafter the posts 5 are swung upwards by hand until the latching members 7 automatically snap into the notches 8.

What is claimed is:

1. In a vehicle, a fixed frame, a load supporting cross beam, pivot means pivotally mounting said beam on said frame for tilting movement in the transverse direction of said frame, side posts pivoted to the ends of said beam to confine the load on said beam, a bracket on said frame, latching members on said cross beam securing said posts in load confining position, said latching members being retractible toward the pivot means for releasing said posts, links connected to said latching members, said links being connected to said frame at a point spaced above said pivot means whereby tilting of said beam about its first means serves to retract the latching member on the lower side of said beam.

2. The invention set forth in claim 1 in which said link includes a compressible spring adapted to cause said latching member to snap into latching position when said post is returned to load confining position.

LUDVIK ISACHSEN.

References Cited in the file of this patent

UNITED STATES PATENTS

| Number | Name | Date |
|---|---|---|
| 1,333,293 | Clark et al. | Mar. 9, 1920 |
| 1,579,821 | Kleinhans | Apr. 6, 1926 |
| 2,181,629 | Slaker | Nov. 28, 1939 |
| 2,495,898 | King | Jan. 31, 1950 |